United States Patent

[11] 3,613,078

[72] Inventors Richard A. Manning
Torrance;
Frank H. Waver, Culver City, both of Calif.

[21] Appl. No. 866,788
[22] Filed Sept. 23, 1969
[45] Patented Oct. 12, 1971
[73] Assignee Computer Sciences Corporation
Los Angeles, Calif.

[54] APPARATUS FOR MONITORING BINARY CODED COMMUNICATIONS
24 Claims, 3 Drawing Figs.

[52] U.S. Cl. .......... 340/146.1, 340/153, 340/324 A, 178/DIG. 22
[51] Int. Cl. .......... H04j 3/14, H04n 1/32, G07h 5/08
[50] Field of Search .......... 340/153, 152, 324 A, 146.1; 178/DIG. 22

[56] References Cited

UNITED STATES PATENTS 3,242,470 3/1966 Hagelbarger et al. .......... 340/153 X

OTHER REFERENCES

Kok, H. Data Equipment for the Seat Reservation System of United Air Lines (2) In Philips Telecommunication Review. 24(Z): p. 68–72. May 1963. TK4.C6.

*Primary Examiner*—Malcolm A. Morrison
*Assistant Examiner*—R. Stephen Dildine, Jr.
*Attorney*—Angus and Mon

ABSTRACT: Monitoring apparatus according to the present disclosure is capable of monitoring binary coded communications between a plurality of stations. The apparatus includes receiver means for receiving binary signal and register means for sampling received binary signals in such a manner that they may be stored into memory means. Display means is provided for retrieving and displaying alpha-numeric representations of the binary signals so that the individual characters of the binary coded communications may be displayed on the display read-out. One feature of the monitoring apparatus resides in a parity check apparatus wherein the parity of the binary coded characters may be verified.

Figure 1A:
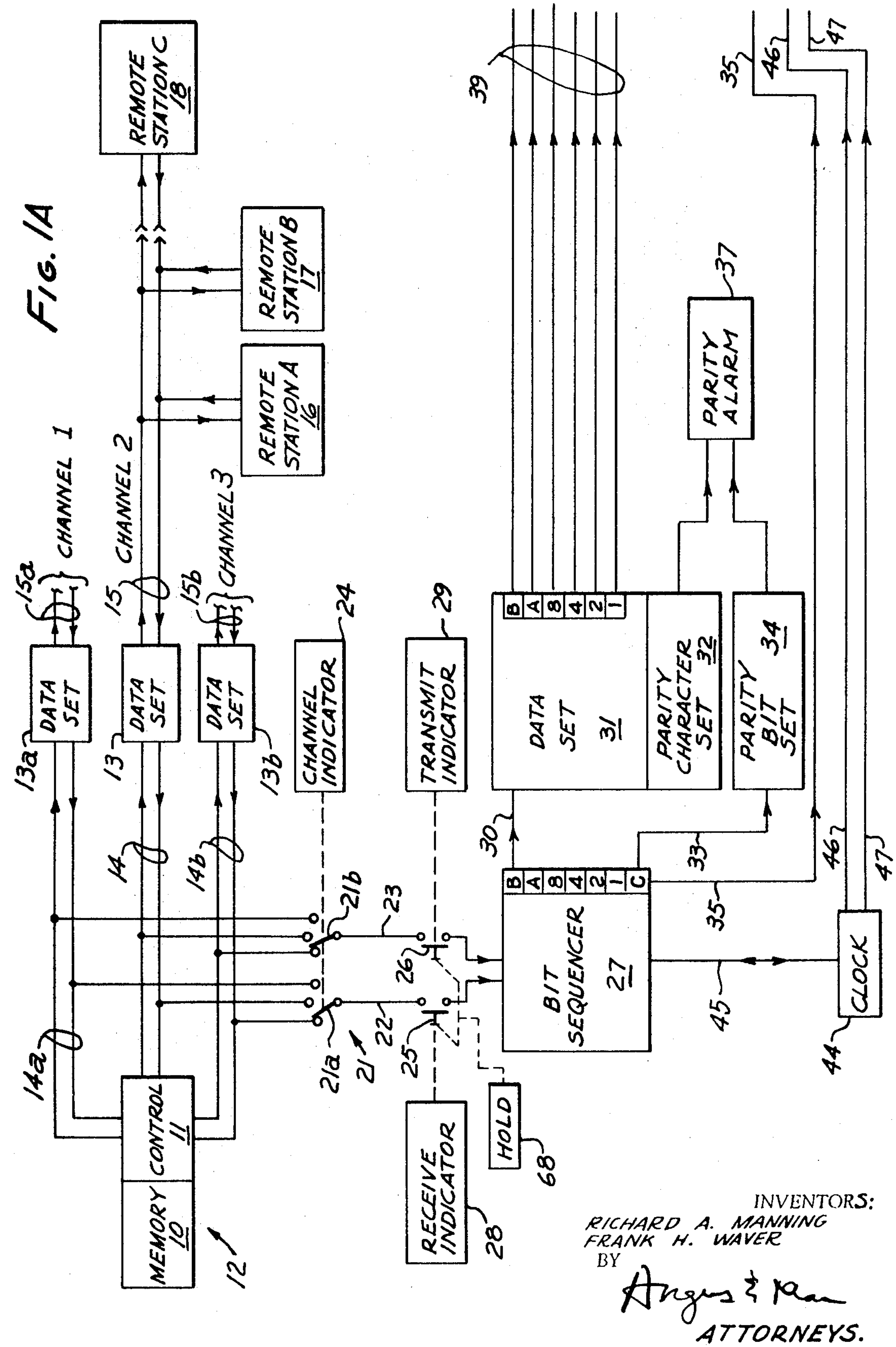

INVENTORS:
RICHARD A. MANNING
FRANK H. WAVER
BY
Angus & Mon
ATTORNEYS.

INVENTORS:
RICHARD A. MANNING
FRANK H WAVER
BY
Angus & Mon
ATTORNEYS.

APPARATUS FOR MONITORING BINARY CODED COMMUNICATIONS

This invention relates to monitoring apparatus, and particularly to apparatus for monitoring binary coded communications between a plurality of stations. The apparatus is particularly useful for monitoring communications between a central digital computer and a plurality of remote input/output terminal devices.

In the copending Cook et al. application, Ser. No. 706,970 filed Feb. 20, 1968 for now U.S. Pat. No. 3,533,084 granted Oct. 6, 1970 for "Space Reservation and Ticket Printing System" and assigned to the same assignee as the present invention there is described a space reservation and ticket printing system capable of reserving space and retrieving information regarding space reservation. Particularly, the aforementioned Cook et al. application describes apparatus wherein tickets to entertainment events may be printed and issued at remote stations for the best space available. This system has been implemented as the well-known "Computicket System" and a purchaser desiring tickets to a particular event may go to any remote Computicket terminal and instruct the operator what event he desires tickets for. The operator, by manipulating keys on the terminal, causes the terminal to communicate in a binary code directly with the central computer for information relating to space available at the particular event. The central computer provides information relating to the best available seats, and if the purchaser desires such seats, the operation causes tickets to be printed by the remote stations, which are issued to the purchaser. Information relating to the tickets sold is stored in the central computer so that other purchasers could not purchase tickets for the same space.

The present invention relates to monitoring apparatus for monitoring binary coded communications, and particularly for monitoring information between the central computer and the remote input/output terminal devices described in the above-identified Cook et al. application.

One problem associated with the aforementioned Cook et al. application resided in the fact that it had been difficult to monitor communications between the central computer and the remote stations. The remote stations of the Computicket system are ordinarily operated by operators who are trained only with respect to the operation of the keyboard control of the terminals and not in analyzing errors or in correcting malfunctions of the apparatus. As the number of terminals connected to the central computer increased, a growing need has been felt for effective monitoring apparatus for monitoring the communications between the central computer and the remote stations so that technicians could locate malfunctions.

Accordingly, one object of the present invention is to provide monitoring apparatus for monitoring binary coded communications between a plurality of stations.

Another object of the present invention is to provide monitoring apparatus for monitoring binary coded communications between a central computer and each of a plurality of remote stations.

Another object of the present invention is to provide monitoring apparatus for monitoring communications between a central computer and a plurality of remote stations of a space reservation and ticket printing system, such as the "Computicket" system.

Another object of the present invention is to provide monitoring apparatus for monitoring binary coded communications, which apparatus provides alpha-numeric display of the control and data characters of the communications so that errors in transmission and receiving may be detected.

In accordance with the present invention, monitoring apparatus is provided having a memory capable of storing data binary representations of the data binary signals of each character of a binary coded message. Receiver means is provided so that the binary signals monitored may be stored in memory and means is provided for reading the binary signals into a converter for conversion to an analog signal. Display means is provided for displaying an alpha-numeric representation of each character of the message.

According to an optional and desirable feature of the present invention, the display means provides display of a plurality of the message characters.

According to another optional and desirable feature of the present invention, parity indicator means is provided for indicating the validity of parity characters and bits in the binary coded messages.

According to another optional and desirable feature of the present invention the data binary signals being monitored are sampled at a rate significantly shorter in duration than the duration of each binary signal.

Figure 1B:
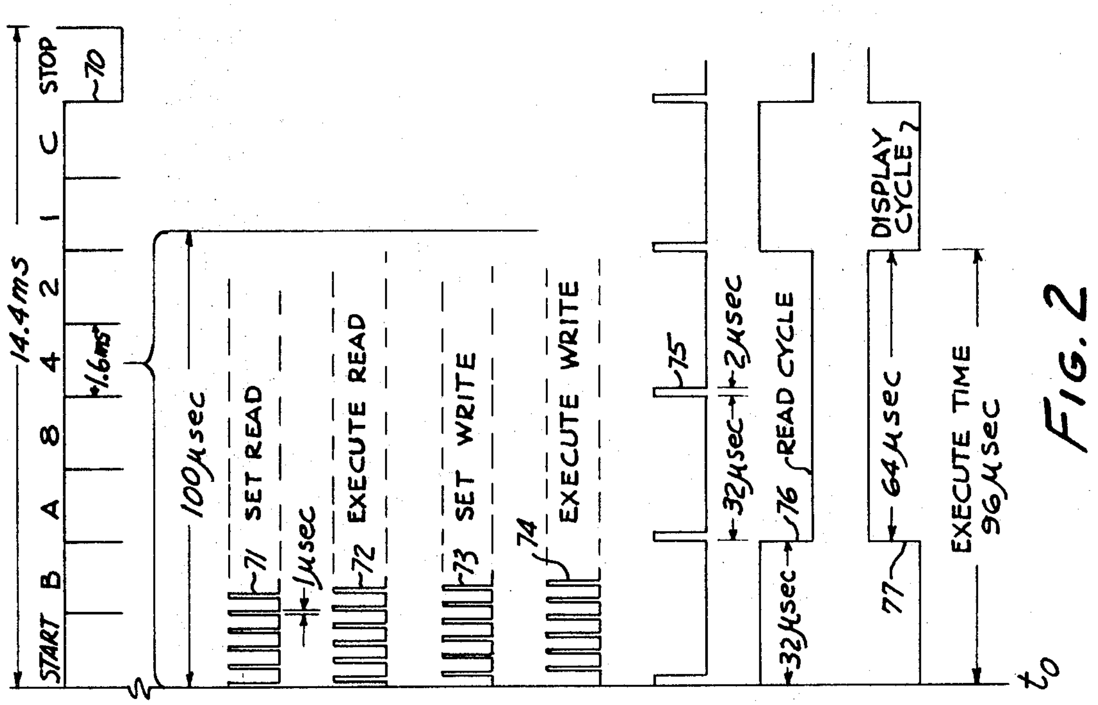
Figure 1B:
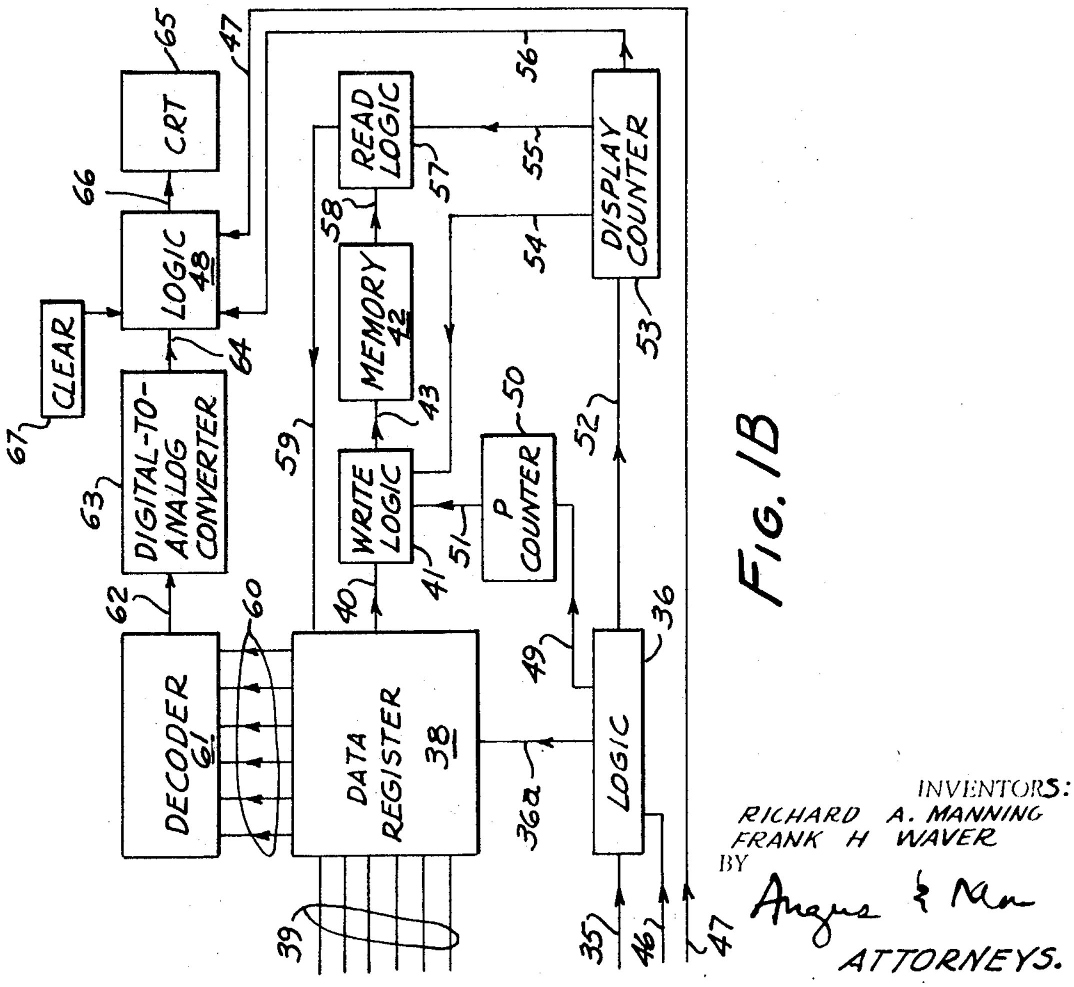

The above and other features of this invention will be more fully understood from the following detailed description and the accompanying drawings, in which:

FIGS. 1A and 1B, taken together, illustrate a block diagram of monitoring apparatus in accordance with the presently preferred embodiment of the present invention, the right-hand edge of FIG. 1A matching with the left-hand edge of FIG. 1B; and FIG. 2 illustrates representations of a plurality of signals for various operations in the apparatus illustrated in FIG. 1A and 1B.

FIGS. 1A and 1B, when edge matched, illustrate monitoring apparatus according to the presently preferred embodiment of the present invention which apparatus is connected to a communications link for binary coded communications such as a link of the information and storage retrieval system described in the aforementioned Cook et al. application. A block diagram of the apparatus described in the aforementioned Cook et al. application is illustrated in the upper portion of FIGS. 1A and 1B. The apparatus comprises a computer memory 10 and computer control 11 which together form a central computer station 12. A plurality of data sets 13, **13*a*, 13*b* are connected via channels 14, 14*a*, and 14*b* to control 11 of the computer. Each of the data sets provide outputs via channels 15, 15*a*, 15*b* to a plurality of remote stations 16, 17 and 18** on each channel.

Although only three remote stations are illustrated on channel 15, it is to be understood that any number of remote stations may be utilized. Also, more than the three channels may be used, and the particular arrangement is given by way of example and not of limitation.

The above-described apparatus comprises an information storage and retrieval system and is described in greater detail in the aforementioned application of Cook et al. In operation of the system described in said Cook et al. application, the central computer polls each remote station on each channel sequentially to determine if the particular remote station is ready to send the message to the central computer. If a polled remote station is prepared to send a message, it sends a transaction message indicative of space desired to be reserved for an entertainment event. The transaction message formulated by the remote stations comprises a plurality of categories, each category indicative of particular information relating to the space desired to be reserved. For example, the transaction message may include information relating to one or more of the following categories: site code, date, number of tickets desired, time code, price, section/area, row/aisle, seat, and special information.

The central computer 12 receives the transaction message and determines whether space is available corresponding to that identified in the transaction message, and if such space is available, the central station replies that such space is available. It is possible to send a transaction message containing information relating to less than all of the categories. For example, a purchaser could request information relating to what seats are available for a particular event. Thus, by sending a transaction message containing information relating to only the number of tickets, identification of the event and the date desired, the central computer will respond with a message completing the categories and offering the best available seats. If the purchaser desires the offered seats, he may accept the offer from the computer and cause the remote station to print out the actual tickets for the seats. At the same time, the central computer stores information in its memory 10 relating to the space purchased so that a subsequent purchaser cannot purchase or rent the same space.

In the event that a remote station is not ready to send a transaction message when polled by the central computer, the remote station merely answers with a reply indicative of the fact that the remote station is in operation but is not ready to send a message.

From the foregoing, it can be understood that a substantial volume of communication occurs between the remote stations and the central computer and that a malfunction in the communication system could go undetected for a substantial length of time due to the lack of human intervention. Hence, it is not always possible to detect errors and the source of errors in the binary coded communications.

The present invention is concerned with monitoring apparatus for monitoring binary coded communications, and particularly for monitoring the space reservation and ticket printing system described in the aforementioned Cook et al. application. It is in respect to the system described in the Cook et al. application and implemented as the "Computicket System" that the monitoring apparatus will be described. It is to be understood however, that the monitoring apparatus may be used in other systems including other types of systems where digital communications are being transmitted. Thus, the present invention is broadly concerned with monitoring digital communications.

In accordance with the present invention, a multipositioned switch 21 having ganged contacts 21*a* and 21*b* is adapted to connect channels 22 and 23 to a selected one of channels 14, 14*a* and 14*b*. Although only three channels are illustrated in the drawings, it is to be understood that more than three channels may be utilized with control 11 of the computer and that an additional position for ganged switch 21 will be included for each channel. Switch 21 is capable of being selectively connected to a selected channel 14, 14*a*, 14*b* of the information storage and retrieval system so that messages being transmitted by the computer to the remote stations are monitored via channel 23 and messages being received by the central computer from the remote stations are monitored on channel 22. Channel indicator 24 is mechanically coupled to switch 21 to indicate the channel 14, 14*a* or 14*b* being monitored.

Pushbutton switches 25 and 26 are serially connected to channels 22 and 23 respectively, to selectively connect channels 22 and 23 to the input of bit sequencer 27. Receive indicator 28 is mechanically coupled to pushbutton switch 25 to indicate the monitoring of data received by computer 12, and transmit indicator 29 is mechanically coupled to pushbutton switch 26 to indicate the monitoring of data transmitted by computer 12. Thus, the condition of indicators 24, 28 and 29 will indicate to a technician which channel 14 is being monitored and whether the computer or remote terminals are being monitored for that channel. As will be more fully understood hereinafter, switches 25 and 26 may be operated at the same time so that bit sequencer 27 receives messages from the central computer as well as messages from the remote terminals.

Bit sequencer 27 has high-impedance input so as not to overload the channel being monitored and includes a plurality of storage positions. For the particular example herein described there are six storage positions B,A,8,4,2 and 1 for storing sit data bits or binary signals and a seventh storage position at C for storing a parity bit or signal. Each character of the messages being monitored may contain seven bits of information, the first six bits being data bits and the seventh being a parity bit. The data bits of each character being monitored are stored in positions B through 1 of bit sequencer 27 and the parity bit is stored in position C. Bit sequencer 27 has an output 30 to data set 31 which also has six storage positions B through 1 to store bits B through 1 of each character. Also associated with data set 31 is parity character set 32 for purposes to be hereinafter explained. The C position of bit sequencer 27 has an output 33 to parity bit set 34 and an output 35 to logic circuit Parity character set 32 and parity bit set 34 have outputs to parity alarm 37. Bit sequencer 27 is also connected to clock 44 via channel 45.

Data register 38 receives each of the six data bits of the character stored in data set 31 via channel 39. Data register 38 receives the bits in parallel and, upon command, sequences them over channel 40 to write logic 41. Write logic 41 causes the bits to be written or stored into memory 42 via channel 43.

Clock 44 provides outputs over channel 46 to logic circuit 36 and channel 47 to logic circuit 48. Clock 44 provides gating signals for each of channels 46 and 47 to enable operation of logic circuits 36 and 48 as well as P counter 50, write logic circuit 41 and display counter 53. The P counter 50 is connected to logic circuit 36 via channel 49 and provides a gate signal for write logic 41. As will be more fully understood hereinafter, P counter 50 provides an address to selectively store data in memory 42. Display counter 53 is connected to logic circuit 36 by channel 52 and provides outputs via channels 54, 55 and 56 to write logic circuit 41, read logic circuit 57 and logic circuit 48, respectively. Read logic circuit 57 receives its input via channel 58 from memory 42 and feeds data information via channel 59 to data register 38 so that data stored in memory 42 may be fed through read logic 57, data register 38, and via channel 60 to decoder 61. Decoder 61 decodes the digital signal and provides an output via channel 62 to digital-to-analog converter 63 which provides an analog output on channel 64 to logic circuit 48. Logic circuit 48, when gated by display counter 53 and clock 44, transfers the analog signal to cathode ray tube 65 via channel 66 so an alpha-numeric representation of the analog signal may be displayed. Clear control 67 is connected to logic circuit 48 and hold control 68 is connected to switches 25 and 26 for purposes to be hereinafter explained. As made more fully apparent, clear control 67 and hold control 68 are provided with indicators (not shown) to indicate that the particular control has been operated.

In operation of the information storage and retrieval apparatus described in the aforementioned Cook et al. application and illustrated in the block diagram in the upper portion of FIGS. 1A and 1B, the central computer polls each remote station. When polled, each remote station will answer a message indicative of the condition of the remote station. Particularly, if the remote station is not ready to send the message, it would send a negative reply character (hereinafter denoted "N"), receipt of which will indicate proper function of the remote station polled but that the station is not ready to send a message. However, if the remote station is ready to send the message, it will reply with a message comprising a transaction character (hereinafter denoted "T") followed by the text of the transaction (hereinafter denoted "TEXT"), followed by an end of message character (hereinafter denoted "E"), and followed by a parity character (hereinafter denoted "P"). For a further description of the text of the message reference may be had to the aforementioned Cook et al. application.

To initiate operation of the polling sequence, the central computer transmits a control character (hereinafter denoted "C") followed by the address of the remote station being polled followed by a polling character. For example, remote stations A, B and C may have individual addresses "A," "B" and "C" respectively. The polling character may be any suitable character, such as "1."

As each remote station is polled individually, the station answers with either a negative reply or with the transaction message to the central computer. In response to the transaction message, the central computer replies with an affirmative reply (hereinafter denoted "Y") to indicate to the remote station that the message was received by the computer without error. Hence, the entire time sequence of the polling and message transaction operation, in real time, may be set forth as follows:

TABLE I

| | | |
|---|---|---|
| 1. | CA1 | (Poll from central computer) |
| 2. | N | (Reply from station A) |
| 3. | CB1 | (Poll from central computer) |
| 4. | T TEXT EP | (Message from station B) |
| 5. | Y | (Confirmation from central computer) |
| 6. | CC1 | (Poll from central computer) |
| 7. | N | (Reply from station C) |
| 8. | CA1 | (Poll from central computer) |
| 9. | N | (Reply from station A) |

Further details of the information storage and retrieval system as herein described may be found in the aforementioned Cook et al. application.

Apparatus according to the present invention monitors the messages transmitted back and forth between the computer and the remote stations so that if error should occur, the source of the error may be determined by a technician.

In operation of the monitoring apparatus in accordance with the present invention, switch 21 is moved to a position to monitor the messages on a desired channel, such as channel 14. One or both of switches 25 and 26 are closed so that bit sequencer 27 receives one or both of the messages being transmitted by the computer and the messages being received by the computer. If only the messages being transmitted by the computer are monitored, messages 1,3,5,6 and 8 in table I will be monitored, whereas if only received messages are to be monitored, messages 2,4,7 and 9 in table I will be monitored. Of course, if both switches 25 and 26 are closed, all messages in table I will be monitored in sequence.

Referring to FIG. 2 there is illustrated a plurality of waveforms which represent the time relationship of certain signals used in the monitoring apparatus in accordance with the present invention. As heretofore explained, each character of the messages comprising the communication between the central computer and the remote stations comprises six data bits and a parity bit, designated B through 1, and C, respectively.

Actually the message characters consist of nine binary signals or bits as in the conventional 9-bit Baudot code, the first bit being a start bit, the next six bits being data bits the eighth bit being the parity bit and the ninth bit being a stop bit. These nine bits are illustrated as waveform 70 in FIG. 2. Each bit is a binary bit and may be called "1" or "0" depending upon its relative signal level. In the case of a Baudot code, the start bit is usually a 1 and the stop bit is usually a 0 although these levels may be reversed.

In the information storage and retrieval system described in the aforementioned Cook et al. application and used in the Computicket System, each bit is 1.6 milliseconds (msec.) in length so that the entire character of nine bits is 14.4 msec. in length. Upon receipt of the start bit of the message character, clock 44 is initiated via channel 45. Clock 44 may be a free-running 1 Megahertz multivibrator producing a series of pulses having a duration of 1 microsecond (μsec.) each. The clock may be run at any speed but, it is preferred that the clock provide a pulse frequency significantly higher than the frequency of binary bits. The pulses are divided into four separate channels (for example by a count of four ring counter) to produce signals illustrated at 71, 72, 73 and 74 in FIG. 2 which provide the set read gate signal, execute read gate signal, set write gate signal, and execute write gate signal, respectively. As illustrated in FIG. 2, each signal 71–74 may provide 1 μsec. pulse every 4 μsec. Signals 71 and 73 are imposed on channel 46 to logic circuit 36 for operation on data register 38, signal 72 is imposed on channel 47 to logic circuit 48, and signal 74 is transferred to write logic circuit 41 via logic circuit 36 and display counter 53. Clock 44 also produces waveform 75 which is transmitted via channel 46 to display counter 53 via logic circuit 36 for purposes to be hereinafter explained. Waveform 75 may, for example, comprise a series of pulses which are 2 μsec. in duration and spaced apart by 32 μsec.

Each bit of each character of the messages being monitored is received by bit sequencer 27 and the data bits are stored in positions 1 through B and the parity bit is stored in position C therein. The value of the parity bit is determined by the structure of the six data bits. If it is desired that the seven bits comprising the data and parity bits of the character always contain an odd number of 1's, the parity bit will be a 0 if the six data bits contain an odd number of 1's and the parity bit will be a 1 if the six data bits comprise an even number of 1's. Hence, the seven bits of the character would always contain an odd number of 1's.

The start bit initiates clock 44 via channel 45, the rest of the bits are sequenced into position by bit sequencer 27. Bit sequencer 27 forwards the binary data bits or signals via channel 30 to data set 31 where they are transferred to positions B through 1, respectively and made ready for transfer to memory. The parity bit is stored in parity bit set 34 where the validity of the parity character is analyzed against the binary bits of the character. If the parity bit is wrong, parity bit set 34 initiates parity alarm 37. When the parity signal has been received in position C in bit sequencer 27, a gating signal is supplied via channel 35 to logic circuit 36. Receipt by the logic circuit 36 of both the gating signal via channel 35 and the set write gating signal 73 causes data register 38 to transfer the data bits from data set 31 to a memory buffer in the data register to prepare for storage in memory 42. Since the gate signal from sequencer 27 is not received until the parity bit is received by the sequencer, the data set is not gated until the pits representing the entire character are ready for memory.

P counter 50 receives gating signal 75 from logic circuit 36 by means of channel 49. The P counter developes an address for the memory so that the character in the buffer section of data register 38 will be transferred to a preselected position in memory 42 in accordance with the address formed by the P counter 50. When the character is received in the buffer section of the data register, the next execute write pulse of waveform 74 illustrated in FIG. 2 is sent from clock 44 to logic circuit 36 and display counter 53 to gate write logic circuit 41. At that time, the data in the buffer section of data register 38 is transferred to memory 42 to the location controlled by the address signal from P counter 50.

The characters stored in memory 42 are read out of memory via channel 58 by read logic circuit 57 during the 32 μsec. read cycle gating signal 76 illustrated in FIG. 2 from display counter 53. Read cycle gate signal 76 gates read logic circuit 57 via channel 55 and the characters read out of memory are transferred via channel 59 to the data register 38. The data register 38 is gated by a set read gating signal 71 illustrated in FIG. 2 to receive the data. The character is transferred to decoder 61 where the binary data signals forming the character are decoded, and the decoded signal is sent to analog-to-digital converter 63 where an analog signal is developed. Display counter 53 provides a 64 μsec. gating signal 77 via channel 56 to logic circuit 48 which together with execute write signal 74 gates the logic circuit to cause the analog signal to be transferred to display tube 65 to display an alpha-numeric character thereon.

Digital-to-analog converter 63 transforms the decoded signal into an alpha-numeric starburst pattern for alpha-numeric readout on cathode ray tube 65. Alpha-numeric cathode ray tube 65 is of the type capable of displaying 256 characters simultaneously and is of a nonlockout type so that new data overwrites old data in the event that more than 256 characters are to be displayed. Hence, the 257th character will replace the 1st character on the display and so on. Hold control circuit 68 is provided to operate on switches 25 and 26 to prevent further reception of binary coded signals to thereby prevent the display on cathode ray tube 65 from being destroyed. Thus, if the technician observing the display on cathode ray tube 65 desires to hold the display to analyze it, hold control 68 may be operated so that further information will not replace an existing display on the cathode ray tube. Clear control circuit 67 may be operated to clear and erase all data from display on the cathode ray tube. Preferably, indicator means (not shown) is associated with clear control circuit 67 and hold control circuit 68 to indicate that the respective control circuit has been initiated.

As illustrated in FIG. 2, read cycle pulse 76 and display cycle pulse 77 occur for mutually exclusive periods of time. The exclusitivity of the time periods of pulses 76 and 77 permits the data register 38 to receive more data from data set 31 while the previous character is being operated on for display purposes on the cathode ray tube during the display cycle time period 77. Hence, data register 38 may be receiving data from data set 31 while data from a previous character is being channelled to decoder 61 for display purposes. The entire execute time required for reading a character from memory 42 and displaying it is 96 μsec. and is determined by the successive periods of time required by the read cycle and display cycle. Since the 96 μsec. execute time for reading characters from memory 42 is significantly shorter than the 1.6 msec. duration of each character bit and is likewise significantly shorter than the 14.4 msec. duration of each character, the communications being monitored are, in effect, being sampled at a rate significantly shorter than the duration rate, or transmission time, of the character.

From the foregoing, it can be understood that the 1 mh. clock provides a pulse frequency significantly higher than the frequency of binary pulse communications being monitored. Thus, when an entire character is received in data set 31, the next set write pulse of clock 44 (which of course will be no more than 4 μsec. later) will cause the data binary signals to be transferred to memory. Thus, it can be understood that the clock provides a sampling pulse for sampling the data input from data set 31 so that the apparatus, in effect, samples the data bits being monitored for display purposes.

Data set 31 is adapted to receive all characters of the messages received being monitored. In the event that a transaction message is being monitored, the data set feeds all control and data characters through to data register 38 with the exception of the parity character P heretofore described. The parity character (which includes six data bits) is detected by data set 31 and is fed to parity character set 32 where the validity of the parity character P is checked against the entire transaction message. In the event that the validity of the parity character indicates that the parity character is in error, parity character set 32 initiates operation of parity alarm 37.

Monitoring apparatus in accordance with the present invention is useful for monitoring binary coded communications, such as the binary coded communications used in the information storage and retrieval system described in the aforementioned Cook et al. application. Most characters, including control and data characters of each message transmitted between the central computer and the remote stations are displayed on the cathode ray tube and a technician, observing the display may detect errors. The significant feature of the present invention resides in the fact that control characters as well as information and data characters are displayed on the cathode ray tube 65 so that errors in control characters as well as errors in data characters may be detected. Also, the source of the errors may be determined by the technician.

The monitoring apparatus is useful for detecting many types of errors. For example, if the monitor receives no messages from any remote station on a channel in response to the polling by the computer, a technician may determine that the channel is inoperative. If no response is received from a particular remote station, that particular remote station may not have energizing power. Errors in control characters and responses as well as errors in information characters may be detected from the display, and errors in parity may be detected by the parity alarm 37.

The following are examples of the effectiveness of the monitoring apparatus in accordance with the present invention:

a. In one case, central computer 12 was not able to poll more than three terminals on a five terminal channel. The fourth terminal could only be polled if the third terminal was engaged in exchanging transaction messages with the computer. Ordinarily, one would suspect that the problem might reside in the circuitry of the fourth terminal and that operation of the third terminal gated the fourth terminal to respond to a polling message. However, when the binary communications between the central computer and the remote stations on the particular channel were monitored, it was revealed that the central computer was not polling the fourth or fifth terminals. Hence, it was apparent that the error was caused by the central computer and not by the fourth terminal, and further investigation revealed that the central computer was improperly programmed.

b. In another case, a bright, hazy or indefinite display of characters from the remote stations on a particular channel revealed an over amplification problem on that channel.

c. In another case, no response to a polling command was received by a particular remote station on a channel. A technician dispatched to the remote station found a connection to the communications link had been broken.

d. In another case, a remote terminal was receiving only part of a message from the central computer. Display on CRT65 of the entire message transmitted by the computer revealed a control character located in the text portion of the message. The presence of the control character had prevented operation by the remote terminal on the remainder of the text of the message. A revision of the software associated with the central computer removed the control character from the messages.

e. In another case, the remote stations of an entire channel were not responding to the polling operations of the central computer. It was found that a power failure on the communications channel had occurred.

The present invention provides apparatus for monitoring binary coded communications between a plurality of stations wherein errors in transmission may be detected and the source of error may be located. With the present invention, technicians may detect errors and determine the source of the errors. The technicians can determine if errors are caused by the communications link, or by one or more of the stations. Furthermore, the type of error may be detected and, as explained in the above examples, the source of error may be revealed.

Monitoring apparatus in accordance with the present invention is highly effective and may be utilized with a plurality of channels. Thus, one monitoring apparatus may be utilized for monitoring several thousand remote stations over several hundred channels. The apparatus in accordance with the present invention is easily used and may be operated with a minimum of trouble. The apparatus is particularly effective for monitoring binary coded communications for the information storage and retrieval system described in the aforementioned Cook et al. application and embodied in the "Computicket" space reservation and ticket printing system.

This invention is not to be limited by the embodiment shown in the drawings and described in the description, which is given by way of example and not of limitation.

What is claimed is:

1. Monitoring apparatus for monitoring communication of binary coded messages between a plurality of stations, each of said messages comprising one or more control characters to control operation of the receiving station, each of said messages may or may not also include one or more data characters, each control character including a combination of control binary signals representing the respective control character and each data character including a combination of data binary signals representing the respective data character, said apparatus comprising: receiver means for receiving said control binary signals and said data binary signals; clock means for producing a plurality of gating signals; memory means for storing retrievable representations of the combination of control binary signals relating to each received control character and for storing retrievable representations of the combination of data binary signals relating to each received data character; write means responsive to binary signals in said receiver means and to a first gating signal from said clock means for initiating said memory means to store representations in said memory means of the binary signals in said receiver means; converter means responsive to a second gating signal from said clock means for converting representations of binary signals stored in said memory means to an analog signal; an alpha-numeric readout means connected to said converter means for displaying an alpha-numeric representation of each of said analog signals to thereby display alpha-numeric representations of each control character and each data character received by said receiver means.

2. Apparatus according to claim 1 wherein each character further includes a parity binary signal having a binary value dependent upon the binary values of all the other binary signals of the respective character, said receiver means including sequencer means for sequencing the other binary signals and parity binary signals of a character to predetermined positions, verifying means for verifying said parity binary signal, and parity alarm means responsive to the verifying means for indicating the validity of the binary value of said parity binary signal.

3. Apparatus according to claim 1 wherein said receiver means includes sequencer means for sequencing the binary signals of each received character, data set means connected to said sequencer means for receiving the sequenced binary signals, and said write means includes data register means for receiving the binary signals from said data set means upon reception of said first gating signal, write logic means connected to said data register means and responsive to a third gating signal from said clock means for transferring said binary signals to said memory means.

4. Apparatus according to claim 3 further including address means connected to said write logic means for controlling the location of storage of representations of the binary signals.

5. Apparatus according to claim 4 wherein said data register means is responsive to said second gating signal to receive binary signals from said memory means, and said converter means includes read logic means connected to said memory means and responsive to a fourth gating signal from said clock means for transferring binary signal representations of a character to said data register means from said memory means, decoder means connected to said data register means for receiving and decoding binary signals from said data register means, and digital-to-analog converter means connected to said decoder means for converting the decoded binary signals to said analog signal.

6. Apparatus according to claim 5 further including first logic means responsive to fifth and sixth gating signals from said clock means and connected to said digital-to-analog converter means for operating said display means.

7. Apparatus according to claim 6 wherein said clock means produces said first, third, second and fifth gating signals sequentially.

8. Apparatus according to claim 7 further including display counter means responsive to said clock means for alternately producing said fourth and sixth gating signals, each of said fourth and sixth gating signals being longer in time duration than the sequence cycle of said first, third, second and fifth gating signals.

9. Apparatus according to claim 8 wherein each character further includes a parity binary signal having a binary value dependent upon the binary values of all the other binary signals of the respective character, said sequencer means sequencing the other binary signals and parity binary signal of a character to predetermined positions, verifying means for verifying said parity binary signal, and parity alarm means responsive to the verifying means for indicating the validity of the binary value of said parity binary signal.

10. Apparatus according to claim 5 wherein each character further includes a parity binary signal having a binary value dependent upon the binary values of all the other binary signals of the respective character, said sequencer means sequencing the other binary signals and parity binary signal of a character to predetermined positions, verifying means for verifying said parity binary signal, and parity alarm means responsive to the verifying means for indicating the validity of the binary value of said parity binary signal.

11. Apparatus according to claim 3 wherein said data register means is responsive to said second gating signal to receive binary signals from said memory means, and said converter means includes read logic means connected to said memory means and responsive to a fourth gating signal for transferring binary signals representations of a character to said data register means from said memory means, decoder means connected to said data register means for receiving and decoding binary signals from said data register means, and digital-to-analog converter means connected to said decoder means for converting the decoded binary signals to said analog signal.

12. Apparatus for monitoring communication of binary coded messages between a plurality of stations, each message comprising one or more control characters to control operation of a receiving station, each of said messages may or may not also include one or more data characters, each control character including a combination of control binary signals and a control parity binary signal, the binary value of the control parity binary signal being determined by the binary values of all the control binary signals of the respective control character, each data character including a combination of data binary signals and a data parity binary signal, the binary value of the data parity binary signal being determined by the binary values of all of the data binary signals of the respective data character, said apparatus comprising: sequencer means for sequentially positioning the respective control and data binary signals and parity binary signal of each respective control and data character monitored; data set means connected to said sequencer means for storing the respective control and data binary signals of each said respective control and data characters; clock means for generating a plurality of gating signals; data register means connected to said data set means for receiving binary signals from said data set means; first logic means connected to said clock means and said sequencer means and responsive to a first gating signal from said clock means and to a parity binary signal in said sequencer means for initiating said data register means to receive binary signals from said data set means; memory means for storing representations of binary signals; address means connected to said first logic means for determining a location in said memory means for storage of the representations of binary signals; write logic means responsive to a second gating signal from said clock means and to said address means for transferring binary signals in said data register means to said memory means for storage in the memory means at locations determined by said address means, said data register means being responsive to a third gating signal from said clock means whereby the data register means is conditioned to receive binary signals from said memory means; counter means connected to said clock means for producing a read cycle gating signal and a display cycle gating signal; read logic means connected to said counter means and responsive to said read cycle gating signal for transferring binary signals of a character from said memory means to said data register means; decoder means connected to said data register means for decoding said binary signals; converter means connected to said decoder means for deriving an analog signal from the decoded binary signals; display means for displaying an alpha-numeric representation of said analog signal; and second logic means connected to said converter means and said counter means and responsive to a fourth gating signal and said display cycle gating signal for operating said display means whereby said display means displays an alpha-numeric representation of each control and data character.

13. Apparatus according to claim 12 wherein the time duration of each monitored binary signal is longer than any gating signal.

14. Apparatus according to claim 12 wherein said first, second, third and fourth gating signals are sequentially generated.

15. Apparatus according to claim 12 further including hold control means connected to said second logic means for holding the display pattern of said display means.

16. Apparatus according to claim 12 further including clear control means connected to said second logic means for removing display patterns from said display means.

17. Apparatus according to claim 12 further including parity set means connected to said sequencer means for receiving said control and data parity binary signals, verifying means for verifying the binary value of said control and data parity binary signals, and parity alarm means connected to said parity set means for indicating the validity of the binary value of said control and data parity binary signals.

18. Apparatus according to claim 17 further including parity character set means connected to said data set means for receiving and verifying the validity of a parity character of a message being monitored, said parity alarm means being responsive to said parity character set means for indicating the validity of the parity character.

19. In a space reservation and ticket printing system having a plurality of remote stations each being adapted to send binary coded information messages containing criteria information at least partially defining desired space over a channel to a central computer station, the central computer being programmed to respond to the information messages from each remote station to select and identify the best available unreserved spaces defined by the information in said information message and to reserve such space to prevent the selected space from being selected in response to subsequent information messages and said central computer being further programmed to send a binary coded reply message over said channel, the reply message containing information identifying the reserved spaces and containing an address indicative of the remote station from which the information message was received by the central computer to cause that remote station to print tickets for the space reserved, each of said information and reply messages including one or more control characters for controlling the operation of the receiving station and said information and reply messages may or may not also include one or more data characters, each control and data character consisting of a plurality of binary signals, at least some of said binary signals of each character being data binary signals, the improvement comprising: monitoring apparatus for monitoring the communication of binary coded messages between the remote stations and the central computer station, said apparatus including receiver means adapted to be connected to said channel for receiving said binary coded information and reply messages; clock means for producing a plurality of gating signals; memory means for storing retrievable representations of combinations of the data binary signals forming each control and data character of the messages being monitored; write means responsive to the data binary signals in said receiver means and to a first gating signal from said clock means for initiating said memory means to store representations of the data binary signals in said receiver means; converter means responsive to a second gating signal from said clock means for converting the representations stored in said memory means to an analog signal; and alpha-numeric readout means connected to said converter means for displaying an alpha-numeric representation of said analog signal to thereby display alpha-numeric representations of each control character and each data character received by said receiver means.

20. Apparatus according to claim 19 wherein a plurality of remote stations are connected to each of a plurality of channels, each channel being connected to the central computer, the apparatus further including selection means selectively connecting said receiver means to one of said plurality of channels.

21. Apparatus according to claim 20 wherein said receiver means includes sequencer means for sequencing the data binary signal of each character, data set means connected to said sequencer means for receiving the sequenced data binary signals, and said write means includes data register means responsive to said first gating signal for receiving the data binary signals from said data set means, write logic means connected to said data register means and responsive to a third gating signal for transferring said data binary signals to said memory means.

22. Apparatus according to claim 21 further including address means connected to said write logic means for controlling the location of storage of representations of the binary data signals.

23. Apparatus according to claim 22 wherein said data register means is responsive to said second gating signal to receive data binary signals from said memory means, and said converter means includes read logic means connected to said memory means and responsive to a fourth gating signal from said clock means for transferring data binary signals representations of a character to said data register means from said memory means, decoder means connected to said data register means for receiving and decoding data binary signals from said data register means, and digital-to-analog converter means connected to said decoder means for converting the decoded data binary signals to said analog signal.

24. Apparatus according to claim 23 wherein each control and data character includes a parity binary signal having a binary value dependent upon the binary values of all the data binary signals of the respective character, said sequencer means sequencing the data binary signals and parity binary signal of each control and data character to predetermine positions, verifying means for verifying said parity binary signal, and parity alarm means responsive to the verifying means for indicating the validity of the binary value of said parity binary signal.